（12）United States Patent
Buchholtz et al.

(10) Patent No.: US 9,573,294 B2
(45) Date of Patent: Feb. 21, 2017

(54) CHAIN FOR A WORK IMPLEMENT, METHOD FOR PRODUCING A STUD FOR A CHAIN AND METHOD FOR PRODUCING A DRIVING MEMBER FOR A CHAIN

(71) Applicant: ANDREAS STIHL AG & CO. KG, Waiblingen (DE)

(72) Inventors: Jochen Buchholtz, Waiblingen (DE); Matthias Schulz, Freiberg (DE); Oliver Gerstenberger, Ditzingen (DE); Thomas Lux, Welzheim (DE); Norbert Apfel, Waiblingen (DE); Nina Regnet, Waiblingen (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 28 days.

(21) Appl. No.: 14/667,718

(22) Filed: Mar. 25, 2015

(65) Prior Publication Data

US 2015/0273729 A1 Oct. 1, 2015

(30) Foreign Application Priority Data

Mar. 25, 2014 (DE) .......................... 10 2014 004 311

(51) Int. Cl.
    *B23D 1/12* (2006.01)
    *B28D 1/12* (2006.01)
    (Continued)

(52) U.S. Cl.
    CPC ............... *B28D 1/124* (2013.01); *B23D 65/00* (2013.01); *B27B 33/14* (2013.01); *Y10T 83/909* (2015.04)

(58) Field of Classification Search
    CPC .......... B28D 1/124; B23D 65/00; B27B 33/14; Y10T 83/909; B23K 20/001; B23K 20/02–20/028; B23K 20/04
    (Continued)

(56) References Cited

U.S. PATENT DOCUMENTS

| 565,049 | A | | 8/1896 | Test |
| 2,872,759 | A | * | 2/1959 | Hagerty ................ B24B 23/06 29/76.1 |

(Continued)

FOREIGN PATENT DOCUMENTS

| DE | 42 28 509 A1 | 3/1994 |
| DE | 199 52 979 A1 | 9/2000 |

(Continued)

*Primary Examiner* — George Nguyen
(74) *Attorney, Agent, or Firm* — Paul D. Strain, Esq.; Strain & Strain PLLC (57) ABSTRACT

A chain for a work implement has lateral connecting members connected to central driving members via studs. The stud has two lateral portions spaced apart from one another by a collar. A driving member is mounted pivotably on the collar. At the collar the stud has a surface layer harder than the base material. For a high chain service life, the stud has a diffusion layer above a surface layer above the base material. To produce the stud, the stud is provided with a diffusion layer at least at the collar, and a surface region of the collar is hardened, such that a surface layer is formed between the diffusion layer and the base material of the stud. For a method for producing a driving member, the driving member is provided with a diffusion layer at least at a circumferential surface of a hole and the driving member is hardened.

16 Claims, 3 Drawing Sheets

(51) Int. Cl.
*B23D 65/00* (2006.01)
*B27B 33/14* (2006.01)

(58) Field of Classification Search
USPC ........... 451/298; 148/206–239; 228/193–195
See application file for complete search history.

(56) References Cited

U.S. PATENT DOCUMENTS

| | | | |
|---|---|---|---|
| 4,042,426 A * | 8/1977 | Beiser | C23C 10/10 148/225 |
| 4,131,492 A * | 12/1978 | Fushimi | C23C 8/28 148/217 |
| 4,531,984 A * | 7/1985 | Madsac | C23C 8/26 148/218 |
| 4,711,676 A | 12/1987 | Kitaori et al. | |
| 4,841,824 A * | 6/1989 | Hartmann | B27B 33/144 83/830 |
| 5,184,598 A * | 2/1993 | Bell | B28D 1/124 125/21 |
| 5,215,072 A * | 6/1993 | Scott | B28D 1/124 125/21 |
| 5,252,146 A * | 10/1993 | Wen | C23C 8/32 148/218 |
| 5,353,506 A * | 10/1994 | Muller | B27B 17/02 30/383 |
| 5,386,756 A | 2/1995 | Stehle et al. | |
| 6,138,658 A | 10/2000 | Bell | |
| 6,186,136 B1 * | 2/2001 | Osborne | B27B 17/02 125/21 |
| 6,283,112 B1 * | 9/2001 | Berglund | B23D 61/185 125/21 |
| 6,503,340 B1 | 1/2003 | Gold et al. | |
| 8,545,642 B2 * | 10/2013 | Fukazawa | C21D 1/06 148/217 |
| 2003/0106617 A1 * | 6/2003 | Black | C23C 8/22 148/219 |
| 2004/0003869 A1 * | 1/2004 | Ishii | C21D 6/001 148/226 |
| 2004/0040630 A1 * | 3/2004 | Eiraku | C23C 8/52 148/217 |
| 2005/0039825 A1 * | 2/2005 | Schuster | C21D 9/40 148/212 |
| 2006/0093849 A1 * | 5/2006 | Farmer | C23C 30/00 428/651 |
| 2006/0243097 A1 * | 11/2006 | Raczykowski | B27B 33/144 76/112 |
| 2007/0125219 A1 * | 6/2007 | Seigneur | B27B 33/14 83/835 |
| 2008/0015072 A1 * | 1/2008 | Nagao | F16G 13/06 474/206 |
| 2008/0193298 A1 * | 8/2008 | Hurst | F01D 5/286 416/241 R |
| 2009/0263237 A1 * | 10/2009 | Box | F01D 5/288 415/177 |
| 2011/0293849 A1 * | 12/2011 | Lembach | F16D 65/127 427/535 |
| 2011/0315275 A1 * | 12/2011 | Chavanne | C21D 1/06 148/217 |
| 2012/0048427 A1 * | 3/2012 | Kubota | C21D 1/06 148/218 |
| 2012/0132051 A1 * | 5/2012 | Moller | B28D 1/124 83/830 |

FOREIGN PATENT DOCUMENTS

| | | |
|---|---|---|
| GB | 2 391 053 A | 1/2004 |
| JP | 01015359 A * | 1/1989 |
| WO | WO 2007/067901 A2 | 6/2007 |

* cited by examiner

CHAIN FOR A WORK IMPLEMENT, METHOD FOR PRODUCING A STUD FOR A CHAIN AND METHOD FOR PRODUCING A DRIVING MEMBER FOR A CHAIN

CROSS-REFERENCE TO RELATED PATENT APPLICATIONS

This application is based upon and claims the benefit of priority from prior German Patent Application No. 10 2014 004 311.8, filed Mar. 25, 2014, the entire contents of which are incorporated herein by reference in their entirety.

BACKGROUND

The application relates to a chain for a work implement, to a method for producing a stud for a chain and also to a method for producing a driving member for a chain according to the subject matter of this application.

Chains for work implements are chains which serve for removing material from or cutting a workpiece. By way of example, a chain of this type can be a saw chain and have cutting teeth for cutting workpieces made of wood or the like. A chain of this type can also be a rock cutter chain having grinding elements for grinding mineral and metallic materials, for example concrete with steel reinforcements. During operation, particles form through the removal of material from the workpiece and can pass into the sites of joints of the chain, where they can lead to increased wear.

DE 42 28 509 A1 and DE 199 52 979 A1 disclose chains for work implements in which the joints are sealed off in order to avoid the penetration of abrasive particles to the sites of joints. This sealing is comparatively complex. The chains have a stud having a collar with an enlarged external diameter on which the driving member is pivotably mounted. A collar stud of this type is deformed at its end regions in such a way that the connecting members are connected fixedly, i.e. both fixed in terms of rotation and fixedly in the direction of the longitudinal central axis of the stud, to the stud at lateral portions of the stud. As a result, there is no relative movement between the stud and the lateral connecting members during operation. The articulated nature of the chain arises solely on account of the fact that the driving members are mounted on the collar of the stud in an articulated manner.

SUMMARY OF PREFERRED EMBODIMENTS

It is one object of the application to provide a chain for a work implement which has a simple structure and a high service life. It is another object of the application to provide a method for producing a stud for a chain. It is yet another object of the application to provide a method for producing a driving member for a chain. Further objects, features, and advantages of the present application will become apparent from the detailed description of preferred embodiments which is set forth below, when considered together with the figures of drawing. With respect to the chain, the method for producing a stud for a chain, and the method for producing a driving member, these and other objects are achieved by the subject matter of this application, including the embodiments described herein.

It is known to provide a surface layer which has a greater hardness than the base material of the stud at the collar of the stud. However, it has been found that the surface layer cannot prevent excessive wear to an adequately effective degree during operation of the chain with workpieces which generate very abrasive particles. It has now been found that the service life of the chain can be increased dramatically if the stud has a diffusion layer at least at the collar. A diffusion layer is in this respect a layer in which the content of one or more elements has been modified in relation to the original composition of the workpiece. The diffusion layer is in this respect a layer which forms through the diffusion of chemical substances into the base material. The diffusion layer is in this respect a surface layer of the stud. The surface layer, which has a greater hardness than the base material of the stud, is arranged between the base material of the stud and the diffusion layer and forms a supporting layer for the diffusion layer. This prevents spalling of the diffusion layer. The hardness of the diffusion layer is in this case in particular greater than the hardness of the surface layer.

In another embodiment of the application, the circumferential surface of the hole in the driving member has a diffusion layer. Because both friction partners, i.e. both the circumferential surface of the hole in the driving member against which the collar of the stud bears and also the collar of the stud, have a diffusion layer, it is possible to achieve a considerably increased service life of the chain even during operation with very abrasive materials. The thickness of the diffusion layer of the driving member preferably corresponds here at least to the thickness of the diffusion layer of the collar. The thickness of the diffusion layer of the driving member is preferably greater than the thickness of the diffusion layer of the collar. It has been found that during operation a higher degree of wear arises on the diffusion layer of the driving member than on the diffusion layer of the collar. Because the thickness of the diffusion layer of the driving member corresponds at least to the thickness of the diffusion layer of the collar and is preferably greater than the diffusion layer of the collar, premature wear to the diffusion layer of the driving member is counteracted.

In a further embodiment of the application, the hardness of the base material of the driving member is preferably greater than the hardness of the base material of the stud. During assembly of the chain, the stud is formed at its end portions. In order to make this forming possible, the hardness of the base material of the stud must not be too high. The driving member is not formed during assembly, however, and therefore the driving member can have a greater hardness than the base material of the stud from the outset. The base material of the driving member thereby itself forms a supporting layer for the diffusion layer, which avoids spalling of the diffusion layer. Alternatively, the driving member can have a surface layer between the base material and the diffusion layer, said surface layer forming a supporting layer for the diffusion layer. The surface layer of the driving member advantageously has a thickness of approximately 0.1 mm to approximately 0.5 mm and a hardness of approximately 500 HV to 800 HV.

In still another embodiment of the application, the hardness of the base material of the stud is preferably approximately 250 HV to approximately 500 HV. The hardness of the base material of the stud is particularly advantageously approximately 300 HV to approximately 450 HV, in particular approximately 320 HV to approximately 400 HV. The stud in this case consists of steel, for example of a low-alloyed tool steel or heat-treated steel such as, for example, 66Mn4 or 42CrMo4 or an unalloyed heat-treated steel or tool steel such as, for example, C60D2 or C75. Heat-treated steels are in this respect steels for which provision is made of the heat-treatment methods of hardening, heat treatment, austempering and surface layer hardening. Heat-treated steels have a carbon content of approximately 0.3% to approximately 0.6%.

In a further aspect of the application, the hardness of the base material of the driving member is in particular from approximately 350 HV to approximately 700 HV, preferably from approximately 400 HV to approximately 650 HV, particularly advantageously from approximately 430 HV to approximately 640 HV. The driving member in this case consists of steel, for example of low-alloyed tool steel such as, for example, 68NiCrMo3-2, unalloyed tool steel such as, for example, C100, low-alloyed heat-treated steel such as, for example, 50CrMo4 or unalloyed heat-treated steel such as, for example, C45.

In still another embodiment, the hardness of the surface layer of the collar is advantageously approximately 600 HV to approximately 940 HV, in particular approximately 700 HV to approximately 930 HV, preferably approximately 750 HV to 920 HV. The hardness of the surface layer of the collar is therefore approximately 1.2 times to approximately 3.6 times the hardness of the base material of the stud. The hardness of the diffusion layer of the collar is advantageously approximately 1200 HV to approximately 2500 HV, in particular approximately 1200 HV to 2250 HV, preferably approximately 1250 HV to approximately 2000 HV. The hardness of the diffusion layer of the collar is therefore advantageously approximately 1.2 times to approximately 4.2 times the hardness of the surface layer of the collar. The hardness of the diffusion layer of the collar is particularly advantageously approximately 1.4 times to approximately 3 times the hardness of the surface layer of the collar.

In still yet a further embodiment, the hardness of the diffusion layer of the driving member is preferably likewise approximately 1200 HV to approximately 2500 HV, in particular approximately 1200 HV to 2250 HV, preferably approximately 1250 HV to approximately 2000 HV. The hardness of the diffusion layer of the driving member is therefore approximately 1.7 times to approximately 7.1 times the hardness of the base material of the driving member.

According to another embodiment of the application, the thickness of the surface layer of the collar is advantageously from approximately 0.1 mm to approximately 1.0 mm. A thickness of the surface layer of approximately 0.2 mm to approximately 0.6 mm has proved to be particularly advantageous. The thickness of the diffusion layer of the collar is preferably approximately 5 μm to approximately 100 μm. A thickness of the surface layer of approximately 5 μm to approximately 70 μm has proved to be particularly advantageous. The thickness of the diffusion layer is preferably smaller, in particular considerably smaller, than the thickness of the surface layer of the collar. The thickness of the surface layer of the collar is preferably a multiple of the thickness of the diffusion layer of the collar. The thickness of the diffusion layer of the driving member is preferably approximately 5 μm to approximately 150 μm, in particular approximately 5 μm to approximately 100 μm.

In a further embodiment of the application, in particular outside the lateral portions the stud has end portions, at which the stud has been formed for fixing the connecting members. It is advantageous that the hardness of the base material of the stud is comparatively low, and therefore the stud can be readily formed at its end portions. The diffusion layer of the collar of the stud and the diffusion layer of the driving member are preferably a layer comprising diffused boron, diffused chromium or diffused vanadium. In this respect, one of these components or a combination of two or three of these components may have diffused into the diffusion layer.

According to yet another embodiment, it is particularly advantageous that the proposed chain is suitable for cutting mineral and metallic workpieces and bears grinding elements for removing material from the workpiece. Particularly during the removal of mineral and metallic materials, fine dust is formed, and this can pass easily to the sites of joints of the chain by virtue of the water commonly used for cooling. The proposed design of the collar of a stud is therefore advantageous in particular for the studs of a rock cutter chain.

In still another embodiment, for producing a stud for a chain, wherein the stud has a collar with an enlarged diameter, it is provided that the stud is provided with a diffusion layer at least at the collar. In a subsequent step, it is provided that a surface region of the collar of the stud is hardened by a first hardening method, such that a surface layer is formed between the diffusion layer and the base material of the stud. The first hardening method can be, for example, a flame hardening method, a laser beam or electron beam hardening method or an inductive hardening method. It is preferably the case that exclusively the surface region of the collar of the stud is hardened by the first hardening method. The first hardening method is accordingly a hardening method by which the stud is hardened only partially.

According to still yet another embodiment of the application, it is preferable that the entire surface of the stud is provided with the diffusion layer. The diffusion layer can thereby be applied in a simple manner. The studs can be processed as bulk material. This gives rise to simple production. In the regions in which the stud does not have a surface layer, the diffusion layer spalls during the forming, and therefore the forming can be effected with a comparatively small force in spite of the very hard diffusion layer. It is preferable that, in a method step which is effected after the diffusion layer has been introduced and before the surface region of the collar is hardened by the first hardening method, the stud is hardened completely by a second hardening method. The second hardening method is in particular a heat-treatment method in which the stud is completely hardened and then tempered. The terms "first hardening method" and "second hardening method" distinguish two hardening methods conceptually, but do not stipulate a sequence of the hardening methods. It is preferable that the method step referred to as "second hardening method" is carried out before the method step referred to as "first hardening method".

In another embodiment, for a method for producing a driving member for a chain, wherein the driving member has at least one hole for connection to a stud of the chain in an articulated manner, it is provided that the driving member is provided with a diffusion layer at least at the circumferential surface of the hole and that the driving member is hardened. The driving member can be hardened in this case in the method step in which the driving member is provided with the diffusion layer. However, the driving member can also be hardened in a subsequent method step. In this case, the driving member is in particular heat-treated, i.e. hardened and tempered. The circumferential surface of the hole in the driving member is in this case the inner surface, i.e. the surface which delimits the hole opening and which lies opposite the outer circumference of the collar and forms a friction partner for the collar of the stud. It can be provided that the driving member is carburized in a surface layer before the diffusion layer is applied. The carburization is effected at least at the circumferential surface of the hole. Simple production arises if the driving member is carburized completely, in particular as bulk material, is provided with the diffusion layer and is hardened.

According to another embodiment of the application, a chain for a work implement is provided, wherein the chain includes a plurality of connecting members, a plurality of driving members, and a plurality of studs. The connecting members are connected in an articulated manner to the driving members by way of the studs and the studs and the driving members comprise steel. At least one stud includes two lateral portions which are spaced apart from one another in the longitudinal direction of the stud and between which there is arranged a collar with an enlarged external diameter. Furthermore, at least two of the connecting members have at least one hole, through which a stud projects, and the connecting members are arranged on the lateral portions of the stud and are connected to the stud fixedly in terms of rotation and fixedly in the direction of the longitudinal central axis of the stud. A driving member is mounted pivotably on the collar of the stud through a hole in the driving member. Moreover, at the collar the stud has a surface layer which has a greater hardness than a hardness of a base material of the stud, wherein the stud has a diffusion layer at least at the collar. Additionally, the surface layer is arranged between the base material of the stud and the diffusion layer and forms a supporting layer for the diffusion layer.

According to another embodiment, the hole in the driving member includes a circumferential surface, wherein said circumferential surface has a diffusion layer. Optionally, the thickness of the diffusion layer of the circumferential surface of the hole in the driving member corresponds at least to the thickness of the diffusion layer of the collar.

In another embodiment, the hardness of a base material of the driving member is greater than the hardness of the base material of the stud. It is possible that the hardness of the base material of the stud is approximately 250 HV to approximately 500 HV. Furthermore, the hardness of a base material of the driving member may be approximately 350 HV to approximately 700 HV. Additionally, the hardness of the surface layer of the collar may be approximately 600 HV to approximately 940 HV. Optionally, the hardness of a diffusion layer of the collar may be approximately 1200 HV to approximately 2500 HV.

According to another embodiment, the thickness of the surface layer of the collar is approximately 0.1 mm to approximately 1.0 mm. Optionally, the thickness of the diffusion layer of the collar is approximately 5 μm to approximately 100 μm.

Further to yet another embodiment, the stud has end portions formed for fixing the connecting members, such that the end portions are located outside the lateral portions. The stud may have a diffusion layer as layer comprising diffused boron, diffused chromium or diffused vanadium.

In still another embodiment, the chain is a chain for cutting mineral and metallic workpieces which bears grinding elements for removing material from the workpiece.

In an embodiment of a method for producing a stud for a chain, the stud includes a collar with an enlarged diameter, and has a diffusion layer at least at the collar. The method includes providing a diffusion layer to the stud. The method may further include hardening a surface region of the collar of the stud by a first hardening method in a subsequent step, such that a surface layer is formed between the diffusion layer and a base material of the stud. Optionally, the entire surface of the stud is provided with the diffusion layer.

Moreover, the method may include hardening the stud completely by a second hardening method a after the diffusion layer has been introduced and before the surface region of the collar is hardened by the first hardening method.

According to an embodiment of a method for producing a driving member for a chain, the driving member includes at least one hole for connection to a stud of the chain in an articulated manner. The method involves providing the driving member with a diffusion layer at least at a circumferential surface of the hole and hardening the driving member. The embodiment may also include carburizing a surface layer of the driving member before the diffusion layer is applied.

BRIEF DESCRIPTION OF THE DRAWINGS

Exemplary embodiments of the application will be explained herein below on the basis of the drawing, in which.

DETAILED DESCRIPTION OF PREFERRED EMBODIMENTS

Figure 1:
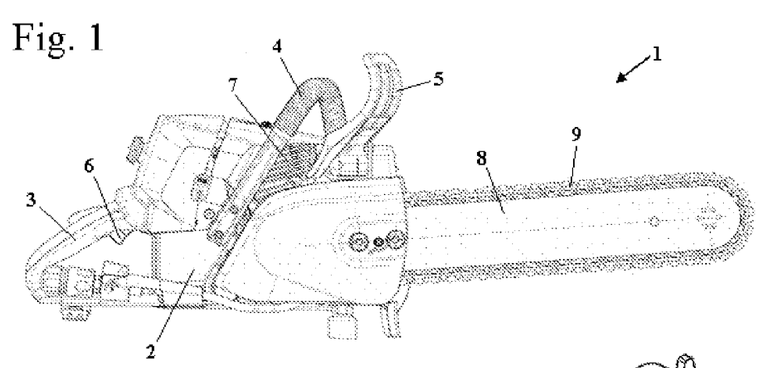
FIG. 1 shows a side view of a rock cutter.

FIG. 1 shows a rock cutter 1 as an exemplary embodiment for a hand-held work implement having a chain. The rock cutter 1 has a housing 2, on which a rear handle 3 and a tubular handle 4 for guiding the rock cutter 1 during operation are fixed. A throttle lever 6 for operating a drive motor 7 arranged in the housing 2 is provided on the rear handle 3. The drive motor 7 is preferably a combustion engine, in particular a two-stroke engine. The drive motor 7 can also be an electric motor, however, which is supplied with energy via a cable or by a rechargeable battery. A guide bar 8, on which a chain 9 is arranged circumferentially, is arranged on the housing 2 of the rock cutter 1. During operation, the chain 9 is driven in a manner circulating around the guide bar 8 by the drive motor 7. A hand protector is fixed to the housing 2 on that side of the tubular handle 4 which faces towards the guide bar 8.

Figures 2, 3, 4:
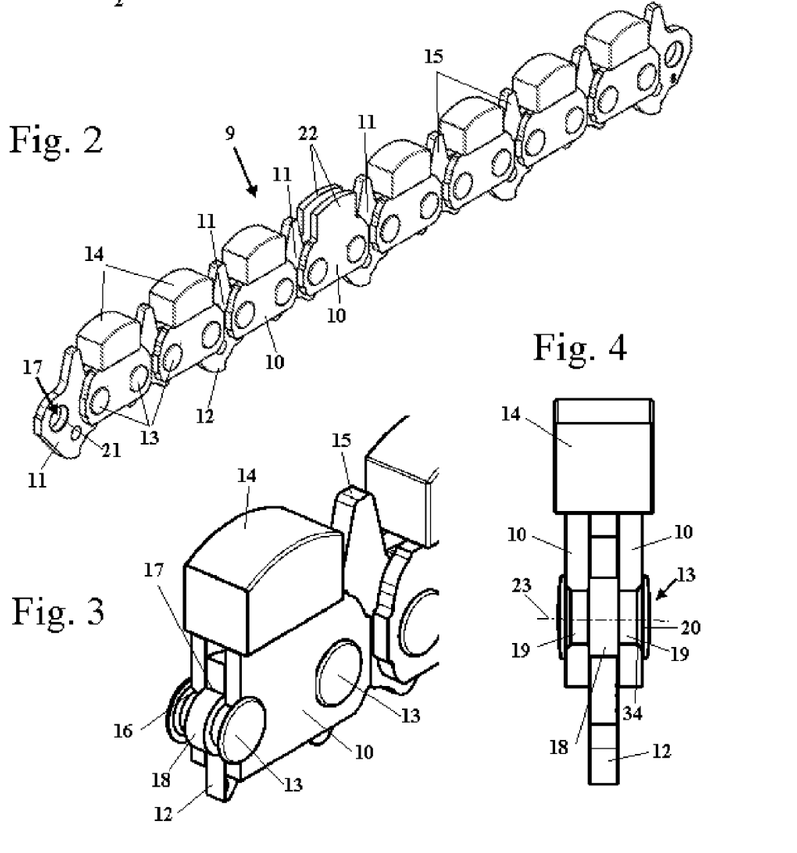
FIG. 2 shows a perspective illustration of a section of the chain of the rock cutter shown in FIG. 1.
FIG. 3 shows a perspective sectional illustration through the chain shown in FIG. 2.
FIG. 4 shows a schematic sectional illustration of the chain.

FIG. 2 shows the structure of the chain 9 of the rock cutter 1 in detail. The chain 9 has connecting members 10 which are arranged laterally in the longitudinal direction of the chain 9 and which are connected to one another in an articulated manner by means of studs 13 via central driving members 11 arranged between the connecting members 10. In this respect, the lateral connecting members 10 are held firmly on the studs 13, and the driving members 11 are mounted on the studs 13 in an articulated manner.

In the case of the chain 9 shown in the exemplary embodiment, every second driving member 11 in the longitudinal direction of the chain 9 has a driving projection 12, which serves for engaging in a drive member of the rock cutter 1. It can also be provided that each driving member 11 has a driving projection 12. Differently shaped driving projections of the driving members 11 can also be advantageous. In the exemplary embodiment, the driving members 11 have supporting humps 15. In each case two lateral connecting members 10 together bear a grinding element 14. By way of example, the grinding elements 14 can contain diamond particles and serve for removing material from the workpiece. A workpiece to be cut using the chain 9 consists of mineral and/or metallic material. As is shown in FIG. 2, the supporting humps 15 are arranged between grinding elements 14 lying in succession in the longitudinal direction of the chain 9 and bring about additional support of the chain 9 on the workpiece. Blows on the grinding elements 14 on account of an excessive feed rate are thereby avoided. Two of the lateral connecting members 11 are in the form of closure members and have, instead of a grinding element 14 connecting the connecting members 10, two spaced apart supporting portions 22. The chain 9 can be opened at this point for repair. As is also shown in FIG. 2, the driving members 11 have holes 17. Each driving member 11 has two holes 17, through each of which a stud 13 projects. The holes 17 have a circumferential surface 21, which delimits the hole 17.

As is shown in FIGS. 3 and 4, the studs 13 have a central collar 18. Compared to the lateral portions 19 arranged to the side of the collar 18, the collar 18 has an enlarged external diameter. The driving member 11 is mounted in an articulated manner with its hole 17 on the collar 18. Two adjacent connecting members 10 are fixed to the lateral portions 19. The connecting members 10 are fixed to the lateral portions 19 of the stud 13 in this case fixed in terms of rotation and fixedly in the direction of a longitudinal central axis 23 of the stud 13. The stud 13 has end portions 20, at which the stud 13 is plastically deformed. The end portions 20 bear against the outer sides of the lateral connecting members 10 and thereby bring about the fixing of the connecting members 10 in the direction of the longitudinal central axis 23. In this case, the stud 13 projects by way of its lateral portions 19 through holes 16 in the connecting members 10. During the plastic deformation of the end portions 20, the material of the stud also expands in the region of the holes 16 in the connecting members 10 and thereby fixes the latter in a manner fixed in terms of rotation on the stud 13. Each stud 13 projects through a hole 17 in the driving member 11 and through a respective hole 16 in the connecting members 10 arranged on both sides of the collar 18.

Figure 5:
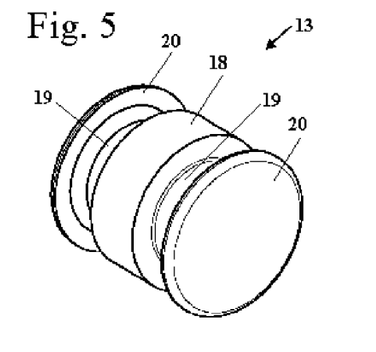
FIG. 5 shows a perspective illustration of a stud of the chain.
Figure 6:
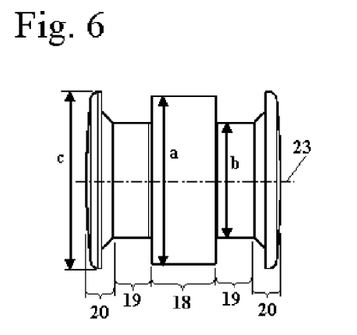
FIG. 6 shows a side view of the stud shown in FIG. 5.

FIGS. 5 and 6 show the structure of the stud 13 in detail. The stud 13 is in the form of what is termed a collar stud and has the collar 18, which has an external diameter a. On both sides of the collar 18, the stud 13 has lateral portions 19, in which the stud has an external diameter b. The external diameter b is smaller than the external diameter a of the collar 18. By way of example, the external diameter b can measure approximately 60% to approximately 80% of the external diameter a. The lateral portions 19 are adjoined by the end portions 20 in each case on the side remote from the collar 18. The end portions 20 project partially into bevels 34, shown in FIG. 4, on the holes 16. In this region, the external diameter of the stud 13 is increased. The end portions 20 have their maximum external diameter c on the outer side of the connecting members 10. The maximum external diameter c can be approximately the same size as the external diameter a of the collar 18. A larger or smaller external diameter c can also be advantageous, however. The external diameter c is greater than the external diameter b in the lateral portions 19, and thereby fixes the connecting members 10 on the stud 13.

Figure 7:
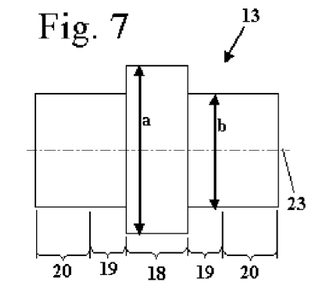
FIG. 7 shows a schematic illustration of the stud before forming.

FIG. 7 shows the stud 13 before the connecting members 10 are mounted and before the end portions 20 are formed. The lateral portions 19 and the end portions 20 have the same external diameter b. During the forming, the end portions 20 are compressed, and the external diameter is increased. The lateral connecting members 10 are thereby fixed on the stud 13.

Figure 8:
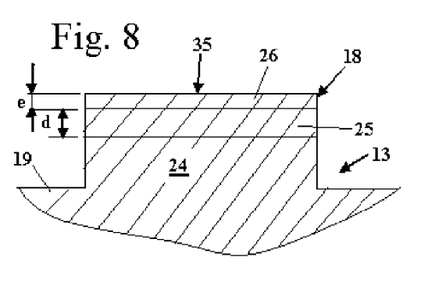
FIG. 8 shows the region of the collar of the stud in a schematic sectional illustration.

During operation, friction arises between the circumferential surface 21 of the hole 17 and the outer surface 35, shown in FIG. 8, of the collar 18. This friction is increased considerably by abrasive particles passing into the gap between the driving member 11 and the collar 18, and therefore wear arises. In order to reduce this wear, it is provided that the collar 18 of the stud 13 bears a diffusion layer 26 on its outer surface 35. The diffusion layer can be, for example, a layer of diffused boron, i.e. a borided layer, a layer of diffused chromium, i.e. a chromized layer, or a layer of diffused vanadium, i.e. a vanadized layer. The diffusion layer 26 has a thickness e of advantageously approximately 5 μm to approximately 100 μm, in particular approximately 5 μm to approximately 70 μm. Beneath the diffusion layer 26, provision is made of a surface layer 25, the hardness of which is greater than the hardness of the base material 24 of the stud 13.

The stud 13 consists of steel, for example of a low-alloyed tool steel or heat-treated steel such as, for example, 66Mn4 or 42CrMo4 or an unalloyed heat-treated steel or tool steel such as, for example, C60D2 or C75. The base material 24 of the stud 13 has a hardness of approximately 250 HV to approximately 500 HV. It is particularly advantageous that the hardness of the base material of the stud is approximately 300 HV to approximately 450 HV, in particular approximately 320 HV to approximately 400 HV. The surface layer of the collar has a thickness d of approximately 0.1 mm to approximately 1.0 mm. The hardness of the surface layer 25 lies between the hardness of the base material 24 and the hardness of the diffusion layer 26. The hardness of the surface layer 25 is advantageously approximately 600 HV to approximately 940 HV, in particular approximately 700 HV to approximately 930 HV, preferably approximately 750 HV to 920 HV. The hardness of the diffusion layer of the collar is considerably greater and is preferably approximately 1200 HV to approximately 2500 HV, in particular approximately 1200 HV to 2250 HV, preferably approximately 1250 HV to approximately 2000 HV. The hardness of the diffusion layer of the collar is advantageously approximately 1.2 times to approximately 4.2 times the hardness of the surface layer of the collar. It is particularly advantageous that the hardness of the diffusion layer of the collar is approximately 1.4 times to approximately 3 times the hardness of the surface layer of the collar. The surface layer 25 forms a supporting layer for the diffusion layer 26. On account of the surface layer 25, the stud 13 can be deformed only slightly in the region of the collar 18, for example during the occurrence of shocks or through particles on the outer surface 35. This prevents spalling of the diffusion layer 26.

Figure 9:
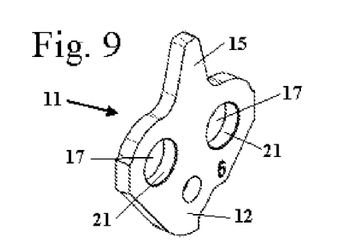
FIG. 9 shows a perspective illustration of a driving member of the chain.
Figure 10:
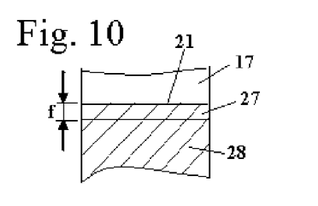
FIG. 10 shows a schematic sectional illustration of the region of the circumferential wall of the hole in the driving member.

FIG. 9 shows the structure of a driving member 11. The driving member 11 has a driving projection 12 and also a supporting hump 15. The driving member 11 has two holes 17, which have a circular cross section and are delimited by the circumferential surface 21. FIG. 10 schematically shows the structure of the driving member 11 at the hole 17. The driving member 11 has a base material 28. The driving member 11 consists of steel, for example of low-alloyed tool steel such as, for example, 68NiCrMo3-2, unalloyed tool steel such as, for example, C100, low-alloyed heat-treated steel such as, for example, 50CrMo4 or unalloyed heat-treated steel such as, for example, C45. The base material 28 has a hardness of approximately 350 HV to approximately 700 HV, preferably of approximately 400 HV to approximately 650 HV, particularly advantageously of approximately 430 HV to approximately 640 HV. To achieve this hardness, the driving member 11 can be hardened. At the circumferential surface 21, the driving member 11 has a diffusion layer 27. The diffusion layer 27 is in this case advantageously a layer into which boron has diffused, i.e. a borided layer, a layer into which chromium has diffused, i.e. a chromized layer, or a layer into which vanadium has diffused, i.e. a vanadized layer. In this respect, only one of these components may have diffused into the diffusion layer 27. A combination of two or three of these components may also have diffused into the diffusion layer, however. The diffusion layer 27 has a thickness f of advantageously approximately 5 µm to approximately 150 µm, in particular approximately 5 µm to approximately 100 µm. The thickness f of the diffusion layer 27 in this respect corresponds advantageously at least to the thickness e of the diffusion layer 26 at the collar of the stud 13. The hardness of the diffusion layer 27 at the circumferential surface 21 of the hole 17 is approximately 1200 HV to approximately 2500 HV, in particular approximately 1200 HV to 2250 HV, preferably approximately 1250 HV to approximately 2000 HV. It is advantageous that the diffusion layer 27 at the circumferential surface 21 has approximately the same hardness as the diffusion layer 26 at the collar 18.

Figure 11:
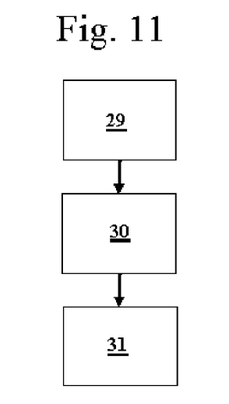
FIG. 11 shows a flow chart for a method for producing the stud of the chain.

FIG. 11 schematically shows a method for producing a stud 13. In a first method step 29, the stud 13, in the non-formed state shown in FIG. 7, is provided with a diffusion layer 26 at least at the collar 18. It is preferable that the entire stud 13 is provided with the diffusion layer 26. During the production of the diffusion layer 26, boron or chromium or vanadium or a combination of two or three of these components diffuses into the surface region of the stud 13. This gives rise to a diffusion layer having a thickness e of approximately 5 µm to approximately 100 µm.

In a second method step 30, the stud 13 is hardened completely by a hardening method. This hardening method can be, for example, a heat-treatment method, in which the stud 13 is hardened and tempered.

In a subsequent, third method step 31, a surface region of the collar 18 of the stud 13 is hardened by a further hardening method. A surface layer 25 is formed in the process between the base material 24 and the diffusion layer 26. The further hardening method is a partial hardening method. The stud is advantageously hardened exclusively at the collar 18, but not in the lateral portions 19 and in the end portions 20. It is preferable that the collar 18 is hardened only in the surface region. The internal diameter of the surface layer 25 is in this case advantageously greater than the external diameter of the stud 13 in the lateral portions 19. By way of example, the further hardening method can be a flame hardening method, a laser beam or electron beam hardening method or an inductive hardening method.

During the assembly of the chain 9, a driving member is mounted on the collar 18, and lateral connecting members 10 are mounted on the lateral portions 19. The end portions 20 of the stud are then formed. During the forming, the diffusion layer 26 extensively spalls in the region of the lateral portions 19 and of the end portions 20. The force required for forming the end portions 20 is thereby not increased excessively by the diffusion layer 26. The diffusion layer 26 can readily spall in these regions because no surface layer 25 is present as a supporting layer for the diffusion layer 26 at the lateral portions 19 and the end portions 20.

Figure 12:
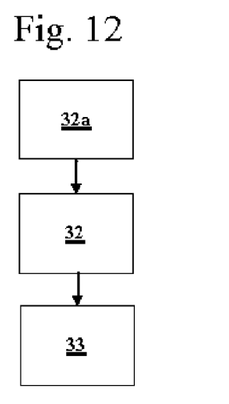
FIG. 12 shows a flow chart for a method for producing the driving member for the chain.

FIG. 12 shows a method for producing a driving member 11. After the main body has been produced from heat-treated or tool steel, in a first method step 32 the driving member 11 is provided with a diffusion layer 27 at the circumferential surface 21 of the hole 17. For this purpose, by way of example, boron or chromium or vanadium or a combination of two or three of these components is diffused into the surface of the driving member 11. In a subsequent, second method step 33, the driving member 11 is hardened. During the hardening, the driving member 11 is preferably heat-treated, i.e. hardened and tempered. In this case, it is advantageous that the entire driving member 11 is hardened, in particular as bulk material. The first method step 32 and the second method step 33 can also be carried out in a common method step, in which the driving member 11 is immediately hardened upon cooling after the diffusion layer 27 has been introduced.

Figures 14, 15, 16, 17:
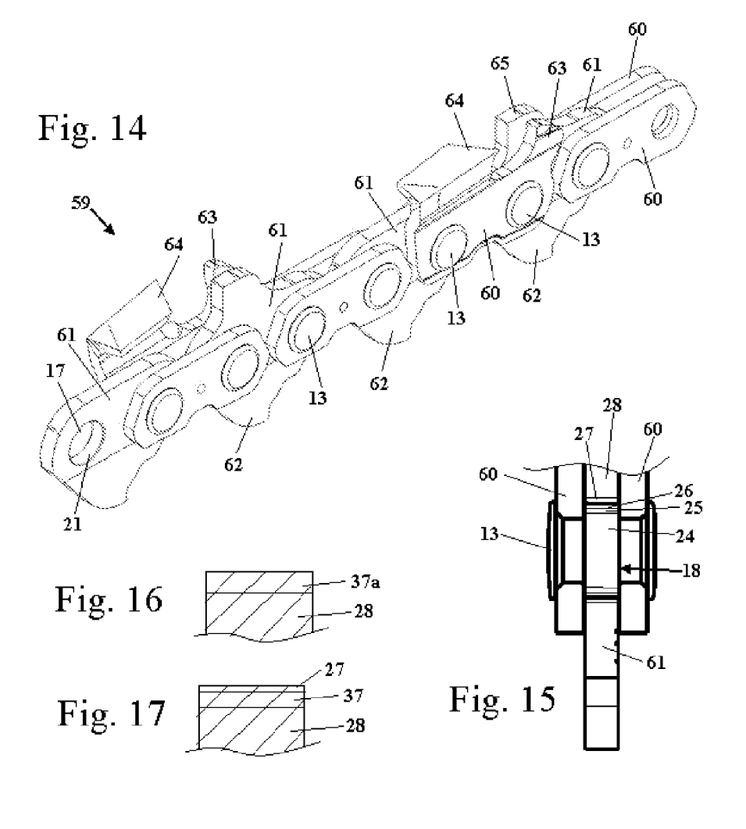
FIG. 14 shows a perspective illustration of a section of the saw chain of the power saw shown in FIG. 13.
FIG. 15 shows a schematic sectional illustration through a stud of the saw chain.
FIG. 16 shows a schematic sectional illustration through a driving member of an exemplary embodiment of a saw chain before a diffusion layer is applied.
FIG. 17 shows a schematic sectional illustration through the driving member shown in FIG. 16 after the diffusion layer has been applied.

In a variant of the method, provision can be made, before the first method step 32, of a method step 32a, in which the driving member 11 is carburized in a surface layer shown in FIG. 16. The surface layer in this method step is designated by the reference sign 37a. The surface layer 37a advantageously has a thickness of approximately 0.1 mm to approximately 0.5 mm. During the carburization, the driving member 11 is enriched with carbon in the surface layer. During the hardening in the second method step 32 (FIG. 17), the surface layer achieves a higher hardness than the base material 28 on account of the higher carbon content. The surface layer after the hardening is designated by the reference sign 37. After hardening, the surface layer 37 has a hardness which lies between the hardness of the base material 28 and the hardness of the diffusion layer 27 and can be, for example, between approximately 500 HV and approximately 800 HV.

Figure 13:
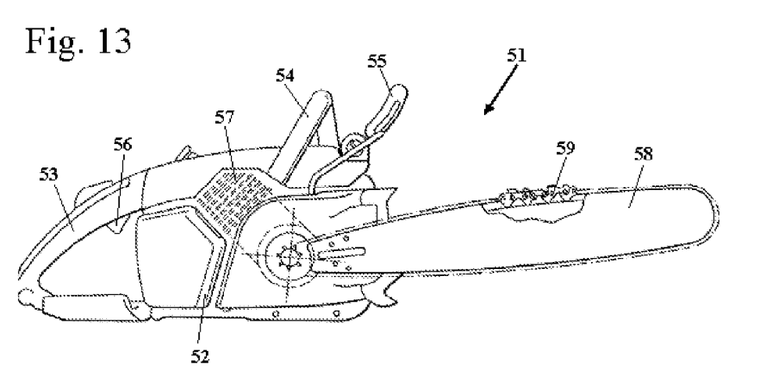
FIG. 13 shows a schematic side view of a power saw.

FIGS. 13 to 15 show an exemplary embodiment of a work implement having a chain, specifically a power saw 51 having a chain 59, which is in the form of a saw chain. The power saw 51 has a housing 52, in which a rear handle 53 and a tubular handle 54 for guiding the power saw 51 during operation are fixed. A drive motor 57, which is preferably a combustion engine, is arranged in the housing 52. However, the drive motor 57 can also be an electric motor, which is supplied with energy via a power cable or via a rechargeable battery. For operating the drive motor 57, a throttle lever 56 is mounted pivotably on the rear handle 53. A guide bar 58, on which the chain 59 is arranged circumferentially, is arranged on the housing 52 of the power saw 51. The chain 59 is driven by the drive motor 57. A hand protector 55 is provided on that side of the tubular handle 54 which faces towards the guide bar 58. The hand protector 55 is preferably mounted pivotably and serves for releasing a chain brake (not shown) for the chain 59.

The structure of the chain 59 is shown in detail in FIG. 14. The chain 59 has lateral connecting members 60, which are connected to central driving members 61 in an articulated manner by way of studs 13. The same reference signs in this respect designate mutually corresponding elements in all the figures. In the exemplary embodiment, each driving member 61 has a driving projection 62 for engagement in a drive member. The lateral connecting members 60 are formed in part as cutting members, which bear a cutting tooth 64. The cutting tooth 64 serves for removing material from a workpiece by cutting, for example a workpiece made of wood. Depth limiters 63 and 65 are provided leading to each cutting tooth 64. One depth limiter 63 is arranged on the connecting member 60 which also bears the cutting tooth 64. A further depth limiter 65 is arranged on the leading driving member 61. It is also possible for a different structure of a chain 59 to be provided.

As is shown in FIG. 14, the driving members 61 have holes 17 having a circumferential surface 21. The structure of the stud 13 and the configuration of the circumferential surface 21 of the holes 17 corresponds to that of the chain 9 of the rock cutter 1. As is shown schematically in FIG. 15, the stud 13 has a base material 24. The stud 13 has a diffusion layer 26 at the collar 18. A surface layer 25, the hardness of which is greater than the hardness of the base material 24 of the stud 13, is provided between the diffusion layer 26 and the base material 24. The surface layer 25 forms a supporting layer for the diffusion layer 26. The driving member 61 has a base material 28, which has a diffusion layer 27 at the hole 17. The configuration and the properties of the layers correspond to those of the chain 9, and therefore reference is made to the description of the first exemplary embodiment with respect to the thickness and hardness of the layers, with respect to the materials and also with respect to the production of the layers.

FIG. 17 shows an embodiment variant for driving members 11 and 61 in sections and schematically in section. A surface layer 37, the thickness of which is greater than that of the diffusion layer 27 and the hardness of which lies between the hardness of the base material 28 and the hardness of the diffusion layer 27, is provided between the base material 28 and the diffusion layer 27. The surface layer 37 is produced by hardening a carburized layer. The carburization is effected in this respect in a method step 32*a* before the diffusion layer 27 is introduced (FIG. 12). The structure of the driving members after carburization and before the diffusion layer is introduced is shown in FIG. 16. The surface layer 37 extends at least at the circumferential surface 21 of the holes 17. It can be advantageous, however, that the entire surface of the driving member 11, 61 has a diffusion layer 27 and an underlying surface layer 37. This makes it possible in particular to easily apply the layers to driving members 11, 61 present in the form of bulk material.

The foregoing description of preferred embodiments has been presented for purposes of illustration and description only. It is not intended to be exhaustive or to limit the application to the precise form disclosed, and modifications and variations are possible and/or would be apparent in light of the above teachings or may be acquired from practice of the application. The embodiments were chosen and described in order to explain the principles of the application and its practical application to enable one skilled in the art to utilize the application in various embodiments and with various modifications as are suited to the particular use contemplated. It is intended that the scope of the application be defined by the claims appended hereto and that the claims encompass all embodiments of the application, including the disclosed embodiments and their equivalents.

The invention claimed is:

1. A chain for a work implement, wherein the chain comprises:
   a plurality of connecting members,
   a plurality of driving members, and
   a plurality of studs,
   wherein the connecting members are connected in an articulated manner to the driving members by way of the studs, wherein the studs and the driving members comprise steel,
   wherein at least one stud comprises two lateral portions which are spaced apart from one another in the longitudinal direction of the stud and between which there is arranged a collar with an enlarged external diameter,
   wherein at least two of the connecting members have at least one hole, through which a stud projects, wherein the connecting members are arranged on the lateral portions of the stud and are connected to the stud fixedly in terms of rotation and fixedly in the direction of the longitudinal central axis of the stud,
   wherein a driving member is mounted pivotably on the collar of the stud through a hole in the driving member,
   wherein at the collar the stud has a surface layer which has a greater hardness than a hardness of a base material of the stud, wherein the stud has a diffusion layer at least at the collar, and wherein the surface layer is arranged between the base material of the stud and the diffusion layer and forms a supporting layer for the diffusion layer.

2. The chain according to claim 1, wherein said hole in the driving member comprises a circumferential surface, wherein said circumferential surface comprises a diffusion layer.

3. The chain according to claim 2, wherein the thickness of the diffusion layer of the circumferential surface of the hole in the driving member corresponds at least to the thickness of the diffusion layer of the collar.

4. The chain according to claim 1, wherein the hardness of a base material of the driving member is greater than the hardness of the base material of the stud.

5. The chain according to claim 1, wherein the hardness of the base material of the stud is approximately 250 HV to approximately 500 HV.

6. The chain according to claim 1, wherein the hardness of a base material of the driving member is approximately 350 HV to approximately 700 HV.

7. The chain according to claim 1, wherein the hardness of the surface layer of the collar is approximately 600 HV to approximately 940 HV.

8. The chain according to claim 1, wherein the hardness of a diffusion layer of the collar is approximately 1200 HV to approximately 2500 HV.

9. The chain according to claim 1, wherein the thickness of the surface layer of the collar is approximately 0.1 mm to approximately 1.0 mm.

10. The chain according to claim 1, wherein the thickness of the diffusion layer of the collar is approximately 5 μm to approximately 100 μm.

11. The chain according to claim 1, wherein the stud comprises end portions formed for fixing the connecting members, wherein the end portions are located outside the lateral portions.

12. The chain according to claim 1, wherein the diffusion layer of the stud is a layer comprising diffused boron, diffused chromium or diffused vanadium.

13. The chain according to claim 1, wherein the chain is a chain for cutting mineral and metallic workpieces which bears grinding elements for removing material from the workpiece.

14. A method for producing a stud for a chain, wherein the stud comprises a collar with an enlarged diameter, wherein the stud comprises a diffusion layer at least at the collar, the method comprising providing a diffusion layer to the stud, further comprising hardening a surface region of the collar of the stud by a first hardening method in a subsequent step, such that a surface layer is formed between the diffusion layer and a base material of the stud.

15. The method according to claim 14, wherein the entire surface of the stud is provided with the diffusion layer.

16. The method according to claim 14, further comprising hardening the stud completely by a second hardening method after the diffusion layer has been introduced and before the surface region of the collar is hardened by the first hardening method.

\* \* \* \* \*